O. O. WITHERELL,

Assignor to L. M. & M. Rumsey.

CHAIN PUMP-VALVE.

No. 7,744. Reissued June 12, 1877.

Attest:

H. C. Tinkham

Geo. Skidmore

Inventor:

Oren O. Witherell

N. PETERS, PHOTO-LITHOGRAPHER, WASHINGTON, D. C.

UNITED STATES PATENT OFFICE.

ORIN O. WITHERELL, OF LEWISTON, MAINE, ASSIGNOR TO LEWIS M. RUMSEY AND MOSES RUMSEY, OF ST. LOUIS, MISSOURI.

IMPROVEMENT IN CHAIN-PUMP VALVES.

Specification forming part of Letters Patent No. 83,117, dated October 13, 1868; reissue 7,744, dated June 12, 1877; application filed June 1, 1877.

*To all whom it may concern:*

Be it known that I, ORIN O. WITHERELL, of Lewiston, in the county of Androscoggin and State of Maine, have invented a new and useful Improvement in Buckets for Chain-Pumps; and I do hereby declare the following is a full, clear, and exact description thereof, which will enable others skilled in the art to make and use the same, reference being had to the accompanying drawings, forming a part of this specification.

Figure 1:
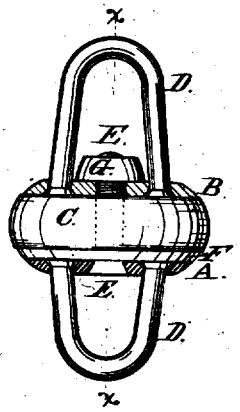
Figure 2:
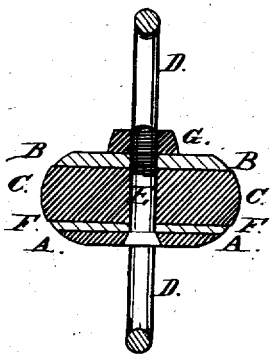

Figure 1 represents a side view, partly in section, of my improved chain-pump bucket. Fig. 2 is a vertical central section of the same, taken on the plane of the line *x x*, Fig. 1.

Similar letters of reference indicate corresponding parts.

This invention relates to an improvement on that class of chain-pump valves or buttons in which a rubber or other elastic button is clamped between two metal plates; and the invention consists in the use of a solid flat or oval rubber, or other elastic disk, contracted at one or both edges in a sufficient degree to cause it to conform to and fit closely into the bore of a pump-tube, and yield to any irregularities in the bore of the pump-tube; and the arrangements of the screw-plates by which the parts are held together, and the button expanded to make up for any wear on its disk, or any enlargement of the bore in the pump-tube while in use.

The screw is made of any suitable metal, and is fitted through the metal heads and through the rubbers into a nut resting upon the upper or opposite head, and may be tightened from time to time as the button or bore of the pump-tube becomes worn, so as to allow the water to pass or leak by the button, thus compressing the center and expanding the rubber disk of the button until it again fits sufficiently close in the bore of the pump-tube.

A, in the drawing, represents one head, and B the other, of a chain-pump valve or bucket. Each head is simply a metal plate with a hole through its center. C represents a rubber or other elastic plate.

I prefer to use rubber for the reason that it is less liable to be permeated or saturated with water, and also because it is more elastic, and adapts itself more perfectly to the bore of the pump-tube, which prevents wastage or leakage, and thus creates a perfect vacuum. This rubber piece or bucket is a solid block or plate, which I have shown, of such thickness as to retain its contact with the pump-tube, notwithstanding the weight of water resting upon it and to be carried up by it, contracted or beveled on one or both of its outer edges to a sufficient degree to cause it to adapt itself to the bore in the pump-tube, having a small perforation in the center, through which a screw, E, passes, which is used to connect together the two metallic heads A B. D D are staples or links.

The screw E is represented with a conical head countersunk in the head A. The screw E passes through the elastic plate C and the head B. Between the plates A and C is interposed a washer, F, which, as the plate A revolves with the screw, prevents it from coming in contact with and rubbing on the elastic plate.

G is a nut which rests on the outside of the plate B and retains the screw in position.

By turning the nut or screw the parts can be securely clamped together and the bucket expanded.

The screw as well as the nuts may be made of any suitable metal, although it is preferable to use brass or some other non-corroding metal.

I am aware that it is not new to provide a chain-pump bucket with a washer of ordinary thickness, made of india-rubber or other elastic material, for various purposes forming no feature of my invention; and I make no claim to such; but

What I claim as new, and desire to secure by Letters Patent, is—

1. In chain-pumps a pump-bucket, having a solid body of rubber of sufficient thickness to sustain the pressure of water, in combination with the links and heads by which the chain is formed.

2. In combination with a pump-bucket, having a solid rubber block, C, the metal heads A B, screw or bolt E, and nut G, constructed substantially in the manner and for the purposes specified.

ORIN O. WITHERELL.

Witnesses:

H. C. TINKHAM,

L. M. SKIDMORE.